T. B. MURRAY.
VEHICLE WHEEL.
APPLICATION FILED JUNE 4, 1912.
1,103,813.
Patented July 14, 1914.
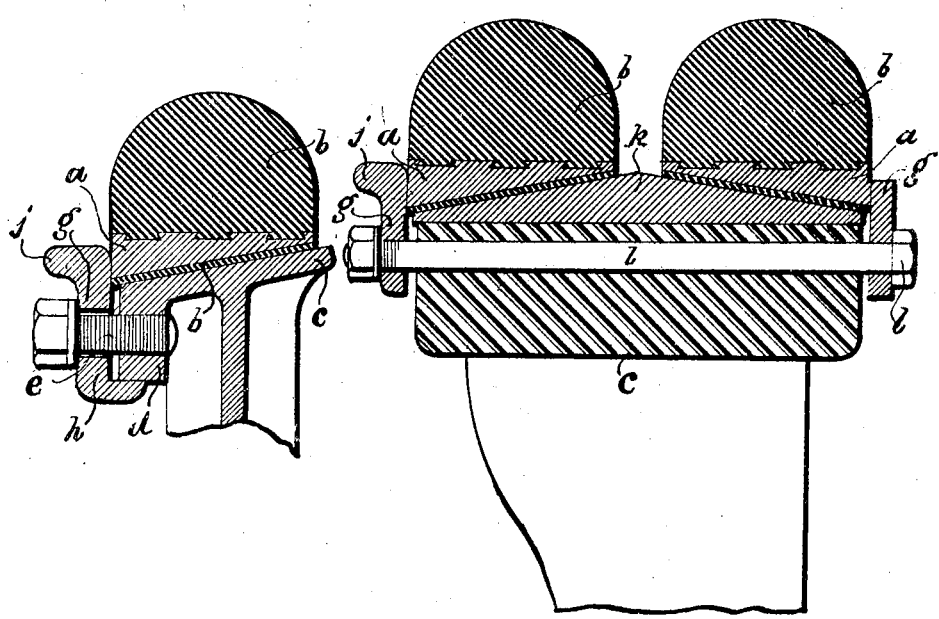
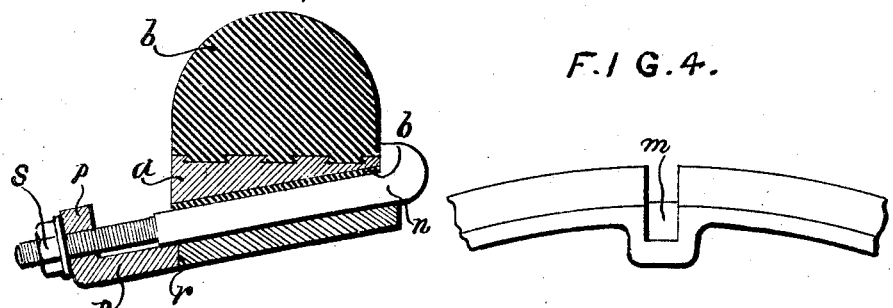
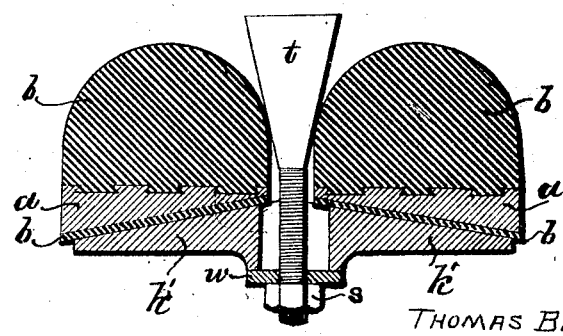
WITNESSES
INVENTOR
THOMAS BLACKWOOD MURRAY
his Attorneys

UNITED STATES PATENT OFFICE.

THOMAS BLACKWOOD MURRAY, OF SCOTSTOUN, SCOTLAND.

VEHICLE-WHEEL.

1,103,813.

Specification of Letters Patent.     Patented July 14, 1914.

Application filed June 4, 1912. Serial No. 701,620.

*To all whom it may concern:*

Be it known that I, THOMAS BLACKWOOD MURRAY, B. Sc., a subject of the King of Great Britain and Ireland, and a resident of Scotstoun, in the county of Renfrew, Scotland, have invented a certain new and useful Vehicle-Wheel, and of which the following is the specification.

This invention relates to wheels for heavy vehicles and particularly to means for securing tires thereon, the tires to which the invention relates being of the solid type permanently fixed on a metal band having a rubber facing on its inner periphery.

The object of my invention is to provide improved means for securing and removing the tire from the wheel periphery.

In the accompanying drawings, Figure 1 is a transverse section through a tire and wheel periphery in which my invention is embodied in one form; Fig. 2 is a similar view of a modified construction; Fig. 3 is a similar view showing my improved draw-off device; Fig. 4 is a partial side elevation of a wheel periphery shaped to receive this form of draw-off; and Fig. 5 is a cross section showing a modified form of draw-off device.

As shown in Fig. 1 the solid tire $b$ is mounted on the band $a$, which will be hereafter referred to as a detachable rim, and which is faced on its inner periphery with rubber $b$. The detachable rim $a$ is cylindrical on its outer periphery, and of substantially the same width as the tire $b$, while the inner periphery is coned or beveled, so that the rim $a$ is wedge-shaped in cross section. The wheel periphery $c$, here made integral with the wheel web, is inclined to the bevel of the inner periphery of the rim $a$, so that the latter with the tire $b$ can be readily forced onto the wheel.

In order to retain the tire in position on the wheel, I have provided an inwardly extending flange $d$ on the wheel periphery in which flange threaded bolt holes are formed at intervals to receive threaded bolts $e$. The latter pass through holes in the retaining ring $g$, the diameter of which is such that it engages the broad edge of the rim $a$, but does not extend beyond the outer periphery of the latter. While the tire is thus securely held on the wheel periphery, it is not confined in any way and its power of absorbing shock and vibration is not lessened as it would be if confined within a channel or sheath. The inner edge of the retaining ring is preferably provided with an offset flange $h$ which engages within the inner periphery of the depending flange $d$ on $c$. The outer edge of the ring $g$ is also provided, preferably, with a lateral bead or flange $j$ to serve as a wearing flange and to protect the heads of the bolts $e$.

For twin tires of the type shown in Fig. 2, I have shown a wheel comprising a wooden felly $c^1$, carrying a fixed rim or wheel periphery $k$ tapered from the center inwardly on both sides. A retaining ring $g$ is provided on each side of the wheel and they are held in place by threaded bolts $l$ passing through apertures in the felly $c^1$.

A simple draw-off device for wheels of the type shown in Fig. 1 is illustrated in Figs. 3 and 4. Transverse grooves $m$ are formed in the outer surface of the wheel periphery, the latter being formed in part in the enlargements $r$ (Fig. 4). When it is desired to detach the tire after the retaining ring $g$ is removed, claw bolts $n$ are passed from one side of the wheel through the grooves $m$, as shown in Fig. 3. The length of the claw bolts is such that when they lie in the grooves $m$, their threaded ends project through apertures in dogs $p$ held temporarily against the enlargements $r$ on the wheel periphery. Nuts $s$ screwed on the ends of the bolts $n$, are then turned up on the latter until they bear against the dogs $p$—whereupon further rotation thereof, draws the rim down the bevel of the wheel periphery and thus frees it for ready removal.

For the removal of twin tires, the device shown in Fig. 5 may be employed. At intervals the wheel periphery $k^1$ is apertured to permit the radial insertion of the stem of the wedge bolt $t$. A bearing plate $w$ passed over the threaded stem rests against the wheel periphery and affords an abutment against which the nut $s$ bears, to draw down the wedge-shaped head of the bolt $t$, thus spreading the tires apart and forcing them down the oppositely inclined faces of the wheel periphery. Obviously the draw-off bolts shown in Fig. 3 may also be used either in combination with the wedge device or alone for the removal of twin tires.

I claim as my invention:

1. In a vehicle wheel, a detachable rim wedge-shaped in transverse cross section, but inclined only on its inner periphery, a fixed wheel periphery beveled on its outer periphery to the incline of the inner periphery of the detachable rim and of substantially the same width as the latter, a radially inward extending flange on the side of least diameter of said wheel periphery, a retaining ring bearing against the edge of the detachable rim to hold the latter in position on the wheel, said retaining ring extending from the wheel periphery radially outward to a point within the outer periphery of the detachable rim on its side of least internal diameter, and bolts passing through said retaining ring and said flange on the wheel periphery to secure said retaining ring in position, said retaining ring having an inwardly extending flange offset to engage the inner periphery of said flange on the wheel periphery, substantially as described.

2. In a vehicle wheel, a detachable rim wedge-shaped in transverse cross section, but inclined only on its inner periphery, a fixed wheel periphery beveled on its outer periphery to the incline of the inner periphery of the detachable rim and of substantially the same width as the latter, a radially inward extending flange on the side of least diameter of said wheel periphery, a retaining ring bearing against the edge of the detachable rim to hold the latter in position on the wheel, said retaining ring extending from the wheel periphery radially outward to a point within the outer periphery of the detachable rim on its side of least internal diameter, and bolts passing through said retaining ring and said flange on the wheel periphery to secure said retaining ring in position, said retaining ring having at its outer edge a laterally extending flange or bead overlying and protecting the bolt heads, substantially as described.

3. In a vehicle wheel, a detachable rim tapered on its inner periphery, a wheel having a fixed periphery tapered to the incline of the inner periphery of said detachable rim, retaining means bearing against the edge of the detachable rim at its side of least internal diameter, and means for securing said retaining means to the fixed periphery of the wheel, said fixed periphery being transversely channeled to receive a withdrawal bolt, substantially as described.

In testimony whereof I have signed my name to this specification, in the presence of two subscribing witnesses.

THOMAS BLACKWOOD MURRAY.

Witnesses:
 DAVID FERGUSON,
 WILFRED HUNT.